Figure 1:
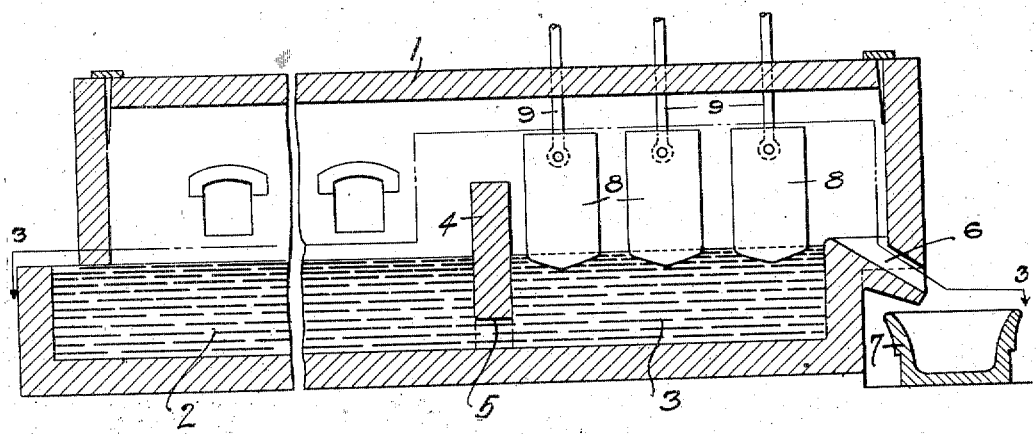

G. E. HOWARD.
METHOD OF DELIVERING GLASS FROM FURNACES.
APPLICATION FILED NOV. 15, 1913.

1,255,884. Patented Feb. 12, 1918.

WITNESSES.
J. R. Keller
Robert C. Tottem

INVENTOR.
George E. Howard
By Bay Totten & Powell
attorneys

UNITED STATES PATENT OFFICE.

GEORGE E. HOWARD, OF BUTLER, PENNSYLVANIA, ASSIGNOR TO THE PITTSBURGH PLATE GLASS COMPANY, OF PITTSBURGH, PENNSYLVANIA, A CORPORATION OF PENNSYLVANIA.

METHOD OF DELIVERING GLASS FROM FURNACES.

1,255,884.

Specification of Letters Patent.    Patented Feb. 12, 1918.

Application filed November 15, 1913.    Serial No. 801,270.

*To all whom it may concern:*

Be it known that I, GEORGE E. HOWARD, a citizen of the United States, and resident of Butler, in the county of Butler and State of Pennsylvania, have invented a new and useful Improvement in Methods of Delivering Glass from Furnaces; and I do hereby declare the following to be a full, clear, and exact description thereof.

My invention relates to an improved method of delivering molten glass from glass tank furnaces, and the object thereof is to deliver the glass from the furnace in a comparatively large mass or body without the use of dipping ladles and other means now employed; second, to deliver glass in large quantities quickly; to deliver the glass in predetermined quantities; and next to deliver the glass by the action of gravity, thereby avoiding many imperfections which are caused by forcibly delivering the glass by pressure and other methods now in use. A further object is to deliver the glass in such manner that the entire surface of the glass may be under atmospheric pressure, and in contact with the furnace gases, whereby uniform temperature can be maintained throughout the mass of the glass, thereby avoiding the uneven temperature in the molten glass which gives rise to defects caused by differences of temperature between the surface of the glass and the interior of the mass, or differences of temperature between different portions of the molten glass.

This invention does not relate to the methods of melting glass nor to the subsequent working of the glass by rolling, drawing, &c., after it is delivered from the tank.

The delivered glass can be discharged into a pot and afterward poured on a casting table or poured into drawing pots and cylinders of glass drawn in the usual manner, or it can be delivered directly onto a table for rolling into sheets. Again it can be delivered through a spout with one end higher than the tank level and the other end connected to the melting tank at a lower level and by this means a flow of glass can be maintained in the spout which will be useful for gathering for hollow ware.

When glass is worked it is in a semifluid or viscous state, and resembles soft dough in consistency. When it is being melted it becomes very thin and hot and impurities readily escape. For working into sheets and for melting it is first allowed to cool, then it is worked in this viscous pasty condition.

In handling large masses of glass entirely different methods must be employed from those methods sometimes practicable for gathering or ladling small quantities. Especially is this true in the art of plate glass making, where the finished product must be free from impurities, and especially free from that defect known as "ream."

Ream is a wavy effect present in glass and caused by the disturbance of its grain or homogeneous character. Its effect is to so disturb the refractory property of the glass as to distort objects seen through it even though the glass is perfectly solid and ground and polished.

Ream is frequently caused by agitation of the body of the glass and invariably occurs whenever the glass (finished in tank or pot), is poured in a small stream from the tank or pot and united again into a mass. Such a mass when rolled or worked is full of reamy streaks showing where the stream of glass has united mechanically with the mass, but with great damage to its refracting properties by reason of the fact that the skin which invariably forms on an exposed surface of the molten glass is never thoroughly assimilated with the rest of the mass so that it disappears altogether. This results in great damage to the refracting properties of the glass. In making large lenses for optical work the avoidance of ream is so important that the glass is not worked when hot, but the pot is allowed to cool and the glass to anneal by cooling off the furnace. Then the pot is broken away and the lens is cut out of the solid block of glass, thus left in its undisturbed state.

In plate glass the refracting property is also highly important, though not so delicate a property as with lenses. Plate glass can only be produced commercially by working the glass in large masses in order to prevent ream.

The present day method of making plate glass is to dump the entire contents of the pot in a mass on the rolling table, care being taken to roll out the mass with the least amount of disturbance. The glass has to be worked rapidly and the pot is tipped suddenly so that it discharges the glass in a large gob or lump, and the drip following is prevented from falling into the mass on the table by quickly drawing the pot away and catching this drip in a separate receptacle. This drip may be afterward mixed in a new charge with the raw ingredients.

In a tank it is found that molten glass can be passed from one compartment of the tank to another by action of gravity through an aperture of large section without producing ream to any appreciable extent. It has further been found that large blocks of refractory clay can be immersed into the body of glass without serious production of ream, provided these blocks are not entirely withdrawn from the glass, which might result in a drip on the main body or mass.

This immersion can be effected rapidly without serious detriment. This is taken advantage of in my delivery method, and whatever resemblance the various elements employed may have to certain existing means, it is believed that the method of using them is entirely novel.

In carrying out my method of operation for the production of glass without ream, care must be taken to have the plungers smooth and without pockets which might trap air and cause bubbles to be taken into the mass of glass. The glass adheres to the plungers, but as they are withdrawn this glass is not severed from the main body, but remains integral with it, and slowly flows back into the main body by gravity.

I secure the operation of my improved method as follows:

The tank containing the glass is divided into two compartments, a melting compartment proper, and a refining and discharging compartment or chamber, separated by a partition wall near the bottom of which is a communicating passage to permit the glass to flow from the melting chamber to the discharge chamber. The plungers are suspended preferably in the discharge chamber, and normally at such a height that only their lower ends are immersed in the glass. The glass slowly passes through the communicating aperture to cause the level in the discharge chamber to rise to the level in the melting chamber.

Next, comparatively rapid lowering of the plungers causes the glass to quickly rise in the discharge chamber. The delivery spout from the discharge chamber, which can be made as wide as desired, furnishes means for a free gravity flow on to a table or into a pot in a comparatively short period of time. Should the level in the discharge chamber be higher than that in the melting chamber, some glass will flow back into the melting chamber; but it is the intent of this method to have the delivery spout considerably larger in area as compared with the communicating opening between the melting chamber and the discharge chamber.

Thus when delivering, a comparatively small proportion of the glass displaced by the plungers passes back into the melting tank, and a proportionately large quantity of glass is delivered.

While the bottom of the delivery spout or opening is shown in the accompanying drawings at a higher level than the level in the melting tank, the exact level of this delivery spout is not pertinent to this method. It is preferably as high or higher than the level of the glass in the melting tank, so that during periods between operations, or when operations are suspended, as on Sundays or holidays, when manufacturing operations cease, there will be no flow of glass from the delivery spout.

However, this level of the delivery spout can be placed considerably lower than the level of the glass in the melting tank, and when the level in the discharge chamber reaches this delivery spout level, the plungers can be rapidly immersed and a rapid delivery effected. Upon the withdrawal of the plungers the level in the discharge chamber will fall below the level of the bottom of the delivery spout, and remain below it until sufficient glass has flowed through the communicating opening between the melting chamber and the discharge chamber to raise the level in the delivery chamber to the level of the delivery spout, whereupon, the operation of glass delivery is repeated. With the delivery spout so arranged at a low level, it is obvious that the tank must be continuously operated, which would ordinarily be objectionable. Such arrangement is here mentioned only as a possible one, and does not result in a material difference in the method of operation, which is the object of this invention.

It is possible also to so proportion the levels of the delivery spout to the glass level in the melting chamber that the level in the discharge chamber, after the plungers are immersed, will be no higher than the level in the melting chamber, and, consequently, no back flow is caused in the communicating opening between the melting chamber and the delivery chamber.

Neither of these last two arrangements are preferable, but mention is made of them to show that this method does not depend upon any arbitrary arrangement of levels, and to show that any such modifications come within the scope of this invention.

The main principle employed in this method consists in the differential time element, that is, delivery takes place at a much faster rate than the rate of flow from the melting chamber to the delivery chamber.

The shorter the time taken for delivery relative to the time for feeding from the melting to the discharge chamber, the greater will be the flow of glass through the delivery spout.

While it is not essential to the principle of this method, it may be stated that normally discharge will be effected in a comparatively few seconds of time, while to feed from the melting to the discharge chamber will normally consume several minutes of time.

Thus I produce in a delivery method from tanks, a similar condition to that produced when glass is poured over the edge of a pot, or through a large opening, by its natural gravity and a tendency to a reamy condition is eliminated. This characteristic of molten glass so well understood especially in the plate glass business, has heretofore prevented the use of any mechanism not using the natural surface flow.

The principle employed in my invention causes the raising of the level of the glass in the delivery reservoir and allows it to flow over the edge of the discharge opening from the surface much in the manner of glass pouring over the edge of a pot. This allows the particles of molten glass to assume their natural position in flowing. The delivery reservoir is open to the interior of the furnace allowing the furnace gases to play freely on the surface of the molten glass and thus maintain a uniform temperature.

The level of glass is regulated by displacement as hereinbefore described. The amount delivered will be proportional to the amount of this displacement and the corresponding rise in level.

Figure 2:
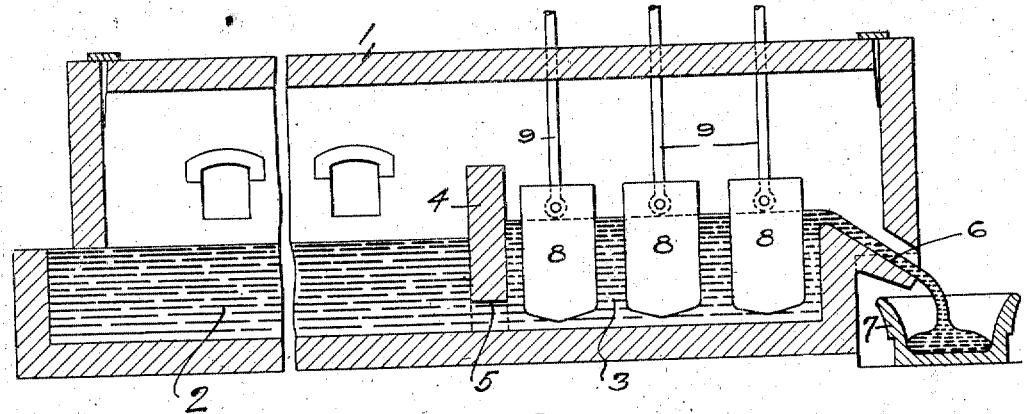
Figure 3:
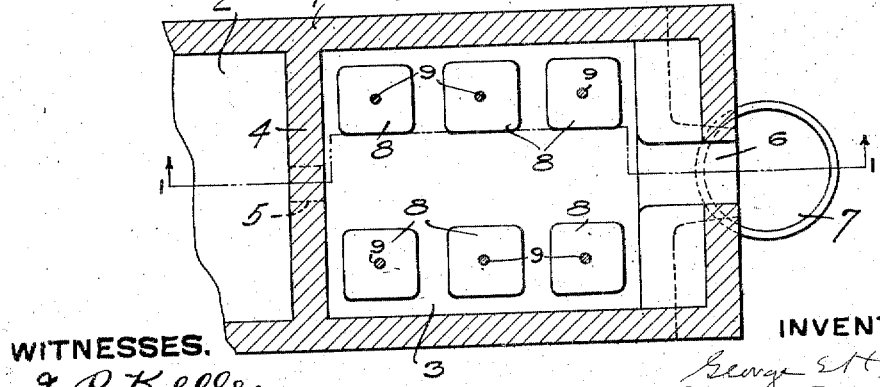

In order that the invention may be thoroughly understood I have illustrated herein one form of apparatus by which the method may be carried out. In the drawings Figure 1 is a vertical longitudinal section of a furnace showing a mechanism for delivering the molten glass, embodying the invention; Fig. 2 is a view similar to Fig. 1 showing the plungers in discharging position; and Fig. 3 is a horizontal section on the line 3—3 Fig. 1 of the apparatus.

In the embodiment of the invention herein selected for illustration, 1 represents a glass furnace having melting compartments 2 and a delivery or discharge chamber 3 separated from the melting compartment by a partition wall 4 having at the base thereof a passage 5 for communicating between the melting and delivery chambers, glass flows through the passage 5 from the melting compartment into the delivery chamber thus bringing the level in the latter up to that in the former. The surface of the glass in both chambers it will be noted is open to the interior of the furnace and thus the heat of the furnace is communicated uniformly to the molten glass in the delivery chamber. The delivery chamber is provided with a spout 8 from which the glass may flow into a pot such as 7 or onto a table to be used in any manner desired. Suspended within and over the delivery chamber are one or more refractory blocks or plungers 8 supported by water cooled rods 9 by which said blocks may be raised also at will by any suitable means of actuating mechanism.

In the operation of the apparatus and after the delivery chamber is filled with molten glass substantially up to the outlet spout 6, the plungers which are normally held in position so that only the lower ends thereof are immersed in the molten glass, may be lowered together or in succession, or one part of them may be operated. The lowering of the plungers in the glass and delivery chamber will obviously raise the level of the glass in said chamber by displacement of its contents. The glass will then flow out through the spout 6 by gravity. The rise of level of the glass in the delivery chamber will be proportionate to the displacement effected by the plunger. By reason of the passage 5 between the melting and delivery chambers a certain amount of glass will necessarily flow back through the opening into the melting chamber as the level in the delivery chamber is raised. But as this opening 5 is small and the time of discharge short, it is obvious that only a small portion of glass will flow back, the greatest part will flow through the discharge spout 6, as this may be made as large and as wide as desired. The speed at which the plungers are lowered will determine largely the speed at which the level of the glass will rise. This, however, will not materially affect the speed at which the glass is discharged through the spout 6 as this depends entirely on the action of gravity and will be determined both by the amount of rise in the level and also the condition of viscosity of the molten glass. Since molten glass is a perfect fluid, and not compressible, the level in the delivery chamber will rise exactly proportionate to the speed of displacement of the plunger. The flow through the opening, however, will act independently of this speed as above explained. This constitutes an important feature of the invention. Thus the discharge is effected entirely by displacement, and as the glass is poured into a pot upon a table, the particles of the glass assume their natural position by gravity which is an essential condition, and experience has shown that this does not detrimentally affect the glass when in the mass.

It is obvious that the operation does not depend on the particular form of the plungers or the material from which they are made, provided they are of such structure as to displace appreciable quantities of glass and thus raise the level of the glass in the delivery chamber. This invention therefore constitutes a modified form of the invention disclosed and claimed in my co-pending application, Serial No. 784,896, filed August 15, 1913.

Several advantages flow from the method of discharge accomplished by this apparatus, but principally the following, to wit; The glass can be delivered in large bulk as the width of the delivery spout may be as great as desired. The change in level or displacement of the glass in delivery chamber may be regulated according to the quantity of glass required. Furthermore, a wide discharge opening and a considerable rise in level will cause the quick delivery of a large quantity of glass. Furthermore, the amount of glass discharged will be proportionate with the amount of displacement and thus a predetermined quantity of glass may be delivered. Again, the discharge or delivery is effected by a rise of level and therefore results entirely from the action of gravity. Finally, the discharge reservoir being open to the interior of the furnace, the surface of the glass will receive the heat of the furnace gases freely and will be maintained in good uniform condition.

The method obviously may be carried out by other forms of apparatus than that herein shown, but said apparatus will serve to illustrate the principle upon which the invention rests.

What I claim is:

1. The method of delivering molten glass from a tank furnace having a delivery chamber constantly communicating with the melting chamber, which consists in feeding the glass into a displacement chamber through a relatively small opening, raising its level in delivery chamber by displacement, and thereafter discharging same through an opening of relatively large area.

The method of delivering molten glass from tank furnace having a delivery chamber constantly communicating with the melting chamber, which consists in feeding glass into a displacement chamber during a comparatively long interval of time, raising the level of glass in delivery chamber by displacement, and thereby discharging glass from displacement chamber in a comparatively short time.

In testimony whereof, I the said GEORGE E. HOWARD have hereunto set my hand.

GEORGE E. HOWARD.

Witnesses:
ROBERT C. TOTTEN,
JOHN F. WILL.